United States Patent
Ignatova

(10) Patent No.: US 11,320,873 B2
(45) Date of Patent: May 3, 2022

(54) METHOD AND ELECTRONIC DEVICE FOR CONTROLLING EXTERNAL DEVICE

(71) Applicant: Samsung Electronics Co., Ltd., Suwon-si (KR)

(72) Inventor: Tetiana Ignatova, Pokrovsk (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 40 days.

(21) Appl. No.: 16/745,784

(22) Filed: Jan. 17, 2020

(65) Prior Publication Data
US 2020/0319683 A1 Oct. 8, 2020

(30) Foreign Application Priority Data
Apr. 8, 2019 (KR) .................. 10-2019-0041051

(51) Int. Cl.
| G06F 1/32 | (2019.01) |
| G06F 1/18 | (2006.01) |
| G06F 1/3287 | (2019.01) |
| G06F 1/3296 | (2019.01) |
| G06F 1/3228 | (2019.01) |

(52) U.S. Cl.
CPC ............ *G06F 1/182* (2013.01); *G06F 1/3228* (2013.01); *G06F 1/3287* (2013.01); *G06F 1/3296* (2013.01)

(58) Field of Classification Search
CPC .................. G06F 1/18; G06F 1/32; G06F 1/26
See application file for complete search history.

(56) References Cited

U.S. PATENT DOCUMENTS

| 2010/0038218 | A1  | 2/2010  | Fisher et al. |
| 2010/0152912 | A1* | 6/2010  | Huang .................... G06F 1/266 700/295 |
| 2011/0112780 | A1* | 5/2011  | Moss .................. H02J 13/0075 702/62 |
| 2011/0302433 | A1* | 12/2011 | Liu ......................... H02J 9/005 713/320 |
| 2014/0067144 | A1  | 3/2014  | Chen et al. |
| 2014/0180486 | A1  | 6/2014  | Newman, Jr. et al. |

(Continued)

FOREIGN PATENT DOCUMENTS

| JP | 2018-169211 A | 11/2018 |
| KR | 10-2011-0110961 A | 10/2011 |

(Continued)

OTHER PUBLICATIONS

Rafii et al.; Degenerate Unmixing Estimation Technique Using the Constant Q Transform; 36th International Conference on Acoustics, Speech and Signal Processing (ICASSP 2011); May 22-27, 2011; Prague, Czech Republic.
Innami et al.; NMF-based environmental sound source separation using time-variant gain features; Elsevier; Computers and Mathematics with Applications 64 (2012) 1333-1342; Contents lists available at SciVerse ScienceDirect; Computers and Mathematics with Applications; www.elsevier.com/locate/camwa; Elsevier Ltd.; 2012; Japan.

(Continued)

*Primary Examiner* — Paul B Yanchus, III
(74) *Attorney, Agent, or Firm* — Jefferson IP Law, LLP

(57) ABSTRACT

A method, performed by an electronic device, of controlling an external device is provided. The method includes sensing noise generated by an operation of the external device, determining, based on the sensed noise, whether the external device operates in an idle state, obtaining an amount of power consumed by the external device during operation when the external device operates in the idle state, and controlling the external device based on the obtained amount of power.

11 Claims, 6 Drawing Sheets

(56) References Cited

U.S. PATENT DOCUMENTS

| | | | | |
|---|---|---|---|---|
| 2015/0355656 A1* | 12/2015 | Lai | ........................ | G05B 15/02 |
| | | | | 700/297 |
| 2017/0256941 A1* | 9/2017 | Bowers | ............... | H02J 13/0006 |
| 2018/0096754 A1 | 4/2018 | Song et al. | | |

FOREIGN PATENT DOCUMENTS

| | | | |
|---|---|---|---|
| KR | 10-2012-0087275 A | 8/2012 |
| KR | 10-2013-0096029 A | 8/2013 |
| KR | 10-1325133 B1 | 11/2013 |
| KR | 10-2016-0054807 A | 5/2016 |
| KR | 10-2018-0027256 A | 3/2018 |
| WO | 2010/084444 A2 | 7/2010 |

OTHER PUBLICATIONS

Korean Office Action with English translation dated Jun. 29, 2020; Korean Appln. No. 10-2019-0041051.
International Search Report with Written Opinion dated Aug. 31, 2020; International Appln. No. PCT/KR2020/000945.
Korean Notice of Allowance with English translation dated Jan. 22, 2021; Korean Appln. No. 10-2019-0041051.
Korean Office Action with English translation dated Dec. 24, 2020; Korean Appln. No. 10-2019-0041051.
European Search Report dated Aug. 9, 2021; European Appln. No. 20787393.6-1202 PCT/KR2020000945.

* cited by examiner

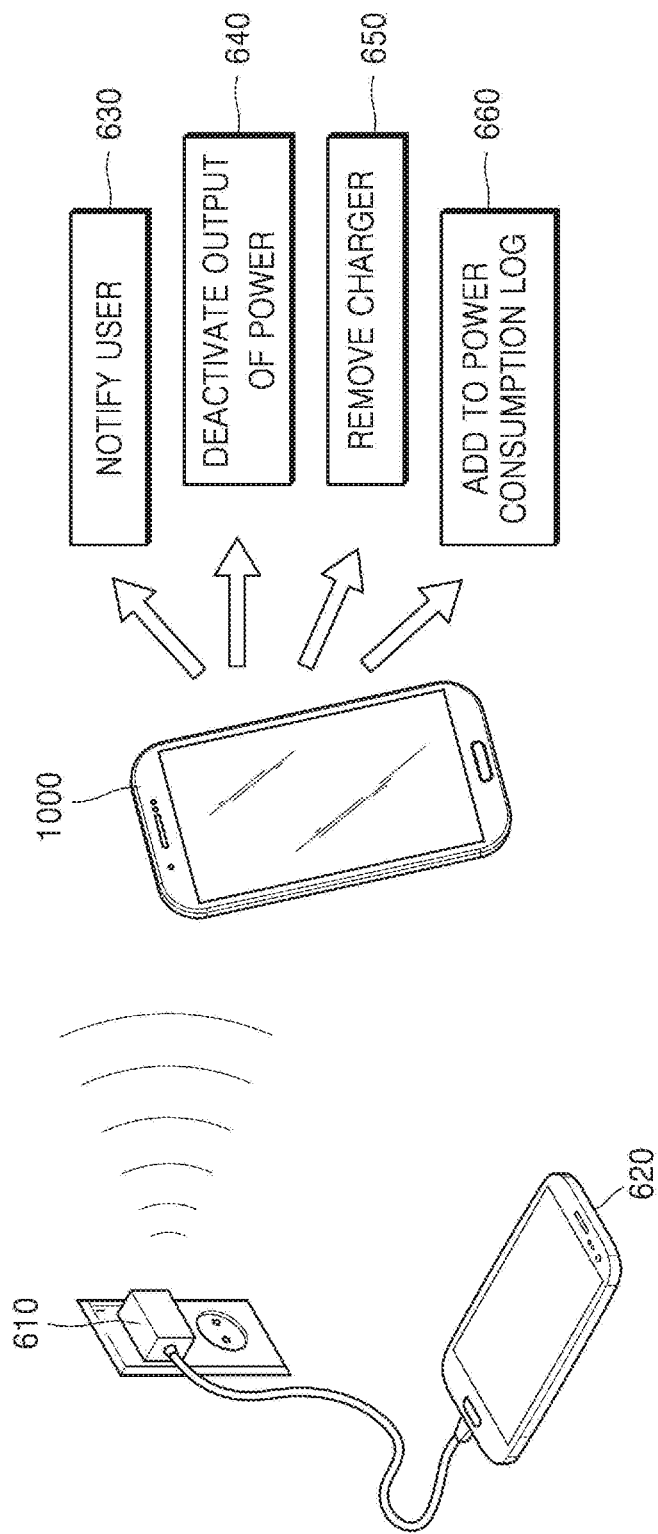

METHOD AND ELECTRONIC DEVICE FOR
CONTROLLING EXTERNAL DEVICE

CROSS-REFERENCE TO RELATED APPLICATION(S)

This application is based on and claims priority under 35 U.S.C. § 119(a) of a Korean patent application number 10-2019-0041051, filed on Apr. 8, 2019, in the Korean Intellectual Property Office, the disclosure of which is incorporated by reference herein in its entirety.

BACKGROUND

1. Field

The disclosure relates to an electronic device for sensing noise generated by an external device and controlling the external device based on the sensed noise, and a method of operating the electronic device.

2. Description of Related Art

According to the development of technology, electronic products having various functions have been supplied to and used in various environments such as homes, offices, and shops. However, as electronic products have increased in number in various environments, the consumption of electric energy has rapidly increased.

In addition, some electronic products may operate in an idle state, such that users operate the electronic products by using remote controls when the users want, or such that the electronic products operate at a scheduled time. Therefore, there is a need for a method capable of minimizing standby power of an electronic product, which may be needlessly consumed, even while a user does not use the electronic product.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide an electronic device controlling an external device so as to minimize standby power by determining a state of the external device based on noise generated by the external device, and a method of operating the electronic device.

Another aspect of the disclosure is to provide a computer program product including a computer-readable recording medium in which a program for executing the aforementioned method on a computer is recorded.

Additional aspects will be set forth in part in the description which follows and, in part, will be apparent from the description, or may be learned by practice of the presented embodiments.

In accordance with an aspect of the disclosure, a method, performed by an electronic device, of controlling an external device is provided. The method includes sensing noise generated by an operation of the external device, determining, based on the sensed noise, whether the external device operates in an idle state, obtaining an amount of power consumed by the external device during operation when the external device operates in the idle state, and controlling the external device based on the obtained amount of power.

In accordance with another aspect of the disclosure, an electronic device is provided. The electronic device includes a sensor, a communicator, a memory storing one or more instructions, and at least one processor configured to execute the one or more instructions stored in the memory to control the sensor to sense noise generated by an operation of an external device, determine, based on the sensed noise, whether the external device operates in an idle state, obtain an amount of power consumed by the external device during operation when the external device operates in the idle state, generate a signal for controlling the external device based on the obtained amount of power, and control the communicator to transmit the generated signal to the external device.

According to another embodiment of the disclosure, a computer program product includes a recording medium having recorded thereon a program for executing the method.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a diagram illustrating an example in which an electronic device controls an external device, according to an embodiment of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, when an element such as a component, a layer, a portion, a region, or the like is referred to as being "connected to" another element, the element may be "directly connected to" the other element, or the element may be "electrically connected to" the other element with an intervening element therebetween. In addition, when an element such as a component, a layer, a portion, a region, or the like is referred to as "including (or comprising)" a certain component, the element may further include (or comprise) another component rather than preclude the other component, unless otherwise specifically stated.

Hereinafter, embodiments of the disclosure will be described in detail with reference to the accompanying drawings.

Throughout the specification, an external device refers to a device external to an electronic device.

Figure 1:
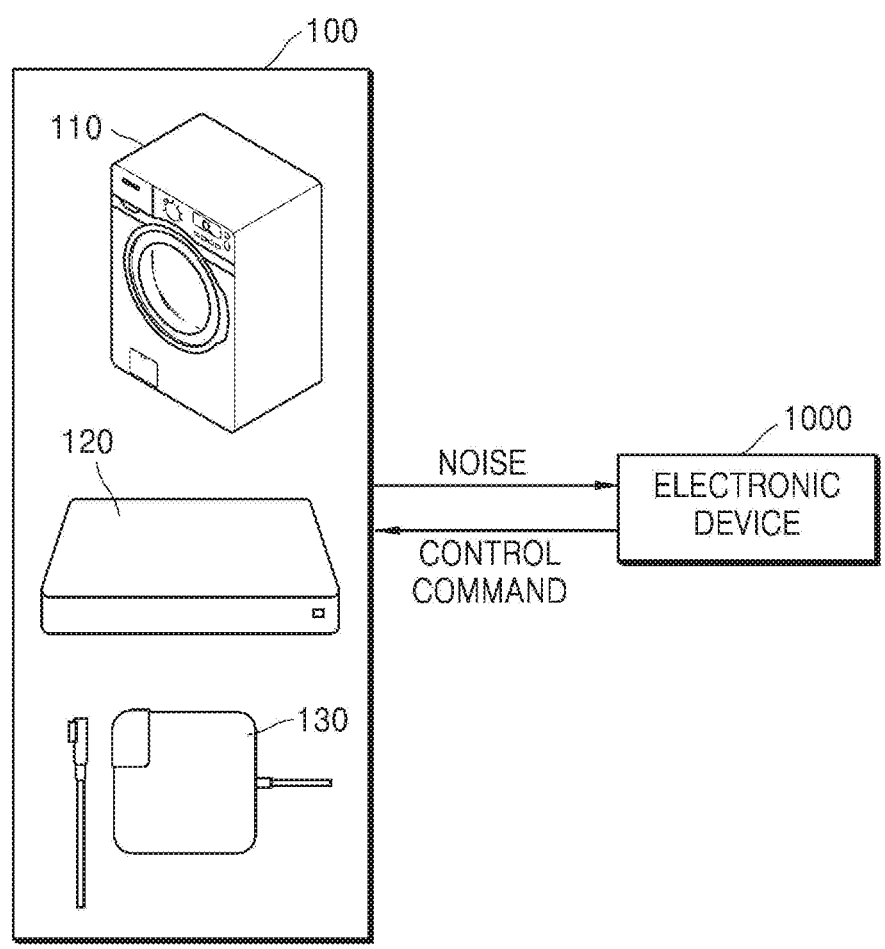
FIG. 1 illustrates an example of sensing noise of an external device, according to an embodiment of the disclosure.

FIG. 1 illustrates an example of sensing noise of an external device, according to an embodiment of the disclosure.

Referring to FIG. 1, an electronic device 1000 according to an embodiment of the disclosure may sense noise of an external device 100 and may control the external device 100 based on the sensed noise.

The electronic device 1000 according to an embodiment of the disclosure may be implemented, in various forms, as a device for sensing the noise of the external device 100 and controlling the external device 100 based on the sensed noise.

For example, the electronic device 1000 described herein may include various types of electronic devices capable of sensing noise, such as smart phones, tablet personal computers (PCs), digital cameras, laptop computers, wearable devices, and the like, without being limited thereto.

In addition, the electronic device 1000 according to an embodiment of the disclosure may include a smart speaker device or a robot vacuum cleaner, as an example of a device for sensing noise and performing a control command on the external device 100.

Without being limited to the examples set forth above, the electronic device 1000 according to an embodiment of the disclosure may include various types of electronic devices, as the device for sensing noise and performing a control command on the external device 100.

The electronic device 1000 according to an embodiment of the disclosure may determine an operation state for the external device 100 as one out of a power-off state, an idle state, and an active state, based on the sensed noise. The electronic device 1000 may determine, based on the determined operation state, whether the external device 100 operates in the idle state.

The power-off state according to an embodiment of the disclosure may refer to a state in which power supplied to the external device 100 is shut off, that is, a state in which there is no power consumed by the external device 100.

The idle state according to an embodiment of the disclosure may refer to a state in which standby power is being consumed in the idle state although power is supplied to the external device 100.

The active state according to an embodiment of the disclosure may refer to a state in which the external device 100 is performing a specific operation according to a user input or pre-scheduled information, that is, a state in which the external device 100 is being substantially used by a user.

Without being limited to the examples set forth above, the electronic device 1000 may determine various operation states of the external device 100.

According to an embodiment of the disclosure, the noise of the external device 100, which may be sensed by the electronic device 1000, may include various types of noise generated according to operations of the electronic device 1000. For example, the noise of the external device 100 may include sounds and vibrations generated by operations of the external device 100, which are not intended by a user.

According to an embodiment of the disclosure, the noise of the external device 100, which may be sensed by the electronic device 1000, may include coil whine that is a vibration noise due to a vibration generated by a current flowing through a coil included in the external device 100. For example, the noise set forth above may include an electromagnetically induced noise due to a vibration generated by electromagnetic induction of a coil.

As another example, the noise of the external device 100 may include a mechanical noise such as a motor noise, a fan noise, or the like, which may be generated due to operations of various components included in the external device 100.

Without being limited to the examples set forth above, the noise of the external device 100 may include various types of noise generated according to various operation states of the external device 100.

The electronic device 1000 according to an embodiment of the disclosure may determine the operation state of the external device 100 by analyzing characteristics of the noise generated by the external device 100.

For example, the magnitude of the noise when the external device 100 is in the active state may be different from the magnitude of the noise when the external device 100 is in the idle state. As another example, a pattern of the noise generated when the external device 100 is in the active state may be different from a pattern of the noise generated when the external device 100 is in the idle state. The pattern set forth above may refer to a pattern for the magnitude of the noise changing during unit time. As yet another example, the noise generated when the external device 100 is in the active state may be different in acoustic characteristics, for example, a frequency, a waveform, or the like, from the noise generated when the external device 100 is in the idle state. Therefore, the electronic device 1000 according to an embodiment of the disclosure may determine the operation state of the external device 100 based on the characteristics of the noise generated by the external device 100, for example, at least one of the magnitude of the noise, the pattern of the noise, or the acoustic characteristics (for example, frequency characteristics, waveform characteristics, or the like) of the noise.

In addition, according to an embodiment of the disclosure, different noise may be generated according to an operation being driven in the external device 100. For example, when an operation of decrypting a password is performed in the external device 100, noise having a pattern, acoustic characteristics, or a magnitude, different from those of noise generated during another operation may be generated.

Throughout the disclosure, the expression "at least one of a, b or c" indicates only a, only b, only c, both a and b, both a and c, both b and c, all of a, b, and c, or variations thereof.

According to an embodiment of the disclosure, the noise generated during the operation of the external device 100 may be different due to various factors, such as the type, model year, manufacture's serial number, or place of manufacture of the external device 100, an ambient environment in which the external device 100 is placed, or the like, as well as due to the operation state of the external device 100. Thus, the electronic device 1000 according to an embodiment of the disclosure may identify the external device 100 corresponding to the noise, based on the characteristics of the noise generated by the external device 100. For example, according to an embodiment of the disclosure, the electronic device 1000 may identify the external device 100 existing in a house based on the sensed noise and may obtain information about the identified external device 100.

In addition, the electronic device 1000 may determine the operation state of the external device 100 corresponding to the sensed noise, based on information about the characteristics of the noise, which correspond to at least one operation state of the identified external device 100.

The aforementioned information about the characteristics of the noise of the external device 100 may include information about the characteristics of the noise analyzed in at least one of a time domain or a frequency domain.

In addition, the information about the characteristics of the noise of the external device 100 may be information pre-stored in the electronic device 1000. For example, the information about the characteristics of the noise, which correspond to various operation states of the external device 100, may be stored, in the form of a database, in the electronic device 1000. As another example, the information about the characteristics of the noise may be stored, in the form of a database, in a server (not shown) and transmitted to the electronic device 1000 according to a request of the electronic device 1000.

According to an embodiment of the disclosure, the database regarding the noise characteristics may be continually updated based on various information collected in relation to at least one external device 100. For example, the database regarding the noise characteristics may be continually updated based on a result of controlling the external device 100 by the electronic device 1000, according to an embodiment of the disclosure. In addition, according to an embodiment of the disclosure, the database regarding the noise characteristics may be updated by the electronic device 1000 or a server (not shown), in which the database is built.

The electronic device 1000 according to an embodiment of the disclosure may sense the noise of the external device 100 by using at least one sensor. The sensor capable of sensing the noise of the external device 100 may include, for example, a microphone, a vibration sensor, a noise detection sensor, or the like. Without being limited to the examples set forth above, the electronic device 1000 may sense the noise of the external device 100 by using at least one sensor of various types, which may sense sounds, vibrations, noise by vibrations, or the like.

Therefore, the electronic device 1000 according to an embodiment of the disclosure may determine the operation state of the external device 100 by using the sensor that is capable of sensing the noise and included in the electronic device 1000, even without a separate device for determining a state of the external device 100.

According to an embodiment of the disclosure, the electronic device 1000 may determine, based on the sensed noise, whether the external device 100 operates in the idle state, and may control the external device 100 such that an amount of power consumed by the external device 100 is minimized, according to a result of the determination. For example, when the amount of power consumed by the external device 100 during the operation of the external device 100 in the idle state exceeds a reference value, the electronic device 1000 may change the operation state of the external device 100 to the power-off state.

According to an embodiment of the disclosure, the amount of power consumed by the external device 100 during the operation of the external device 100 in the idle state may be an amount of power consumed by the external device 100 while the external device 100 is continuously operated in the idle state from a first time point until a current time point. The first time point may be determined as one time point among time points while the external device 100 is continuously operated in the idle state. For example, the first time point may be determined as a time point at which the external device 100 starts to operate in the idle state.

According to an embodiment of the disclosure, the amount of power consumed by the external device 100 during the operation of the external device 100 in the idle state may be obtained based on at least one of capability information about the external device 100 or information about the noise generated by the operation of the external device 100.

For example, the electronic device 1000 may determine the operation state of the external device 100 based on the information about the noise generated by the operation of the external device 100, and may obtain the amount of power consumed per unit time according to the operation state of the external device 100 based on the capability information about the external device 100.

In addition, according to an embodiment of the disclosure, the amount of power consumed by the external device 100 during the operation of the external device 100 in the idle state may be obtained based on at least one of a time period consumed while the external device 100 operates in the idle state or information about the amount of power consumed for a certain time period by the external device 100. The information about the amount of power consumed for the certain time period by the external device 100 may include, for example, information about an amount of average power consumed per unit time by the external device 100 in the idle state.

Without being limited to the examples set forth above, the electronic device 1000 may obtain the amount of power consumed by the external device 100 during the operation of the external device 100 in the idle state, based on various information.

According to an embodiment of the disclosure, the electronic device 1000 may control the external device 100 such that the amount of power needlessly consumed by the external device 100 may be minimized, based on various information as well as the amount of power consumed by the external device 100 during the operation of the external device 100 in the idle state.

According to an embodiment of the disclosure, when it is determined that the idle state of the external device 100 will continue for a reference time or more, the electronic device 1000 may control the external device 100 such that the amount of power consumed due to the operation of the electronic device 1000 in the idle state may be minimized.

For example, the electronic device 1000 may obtain information about an operation pattern of the external device 100 and may determine, based on the information about the operation pattern, whether the idle state of the external device 100 will continue for the reference time or more. In addition, the electronic device 1000 may control the external device 100, based on the amount of power consumed by the external device 100 operating in the idle state until the current time point and a result of the determination set forth above.

As an example, although the amount of power consumed is equal to or less than a reference value, when it is determined, based on the operation pattern of the external device 100, that the idle state of the external device 100 will continue for the reference time or more, the electronic device 1000 may control the external device 100 such that the external device 100 operates in the power-off state for a first time period. The first time period may be determined based on a time period for which the external device 100 is predicted to operate in the idle state according to the operation pattern of the external device 100.

In addition, when the external device 100 is predicted to change from the idle state to the active state within the reference time based on the operation pattern of the external device 100, the electronic device 1000 may operate such that the external device 100 maintains the idle state.

As an example, although the amount of power consumed is equal to or greater than the reference value, when the external device 100 is predicted to change from the idle state to the active state within the reference time based on the operation pattern of the external device 100, the electronic device 1000 may operate such that the idle state of the external device 100 is maintained.

According to an embodiment of the disclosure, the operation pattern of the external device 100 may be determined by continual learning based on the operation state of the external device 100, which is determined by the electronic device 1000. In addition, the operation pattern of the external device 100 may be determined based on information provided from outside the electronic device 1000. Without being limited to the examples set forth above, the operation pattern of the external device 100 may be obtained by the electronic device 1000 through various methods.

In addition, when it is predicted, based on information about a scheduled operation for the external device 100, that the operation state of the external device 100 will change from the idle state to the active state within the reference time, the electronic device 1000 may operate such that the operation state of the external device 100 is maintained as the idle state rather than changed to the power-off state. As an example, although the amount of power consumed is equal to or greater than the reference value, when the external device 100 is predicted to change from the idle state to the active state within the reference time based on the information about the scheduled operation, the electronic device 1000 may operate such that the idle state of the external device 100 is maintained.

Therefore, according to an embodiment of the disclosure, considering user convenience and the fact that the amount of power required for a change from the power-off state to the active state is greater than the amount of power required for a change from the idle state to the active state, when it is determined that the operation state of the external device 100 will change from the idle state to the active state within the reference time, the electronic device 1000 may operate such that the idle state of the external device 100 is maintained.

Without being limited to the examples set forth above, the electronic device 1000 may control the external device 100 such that the amount of power needlessly consumed by the external device 100 may be minimized, based on various information about the operation of the external device 100.

The external device 100 according to an embodiment of the disclosure is a device except for the electronic device 1000 according to an embodiment of the disclosure and may include various types of devices generating noise in various operation states. For example, the external device 100 may include various types of home appliances, such as a washing machine 110, a set-top box 120, a charger 130, or the like, which may make continuous use of power provided in a house. Without being limited to the examples set forth above, the external device 100 according to an embodiment of the disclosure may include various types of devices consuming power.

The external device 100 according to an embodiment of the disclosure may be a device that may use power continuously provided from outside thereof. For example, the external device 100 may be a device stably supplied with power from outside thereof via a socket outlet in a house.

As the external device 100 is stably supplied with power even in the idle state, the external device 100 may maintain the idle state in which an input of a user may be received. However, when the idle state in which a user does not use the external device 100 continues, there is a drawback of excessively consuming unnecessary standby power.

Therefore, the external device 100 according to an embodiment of the disclosure may sense the external device 100 consuming unnecessary power equal to or greater than a reference value in the idle state and may control the external device 100 such that the external device 100 is prevented from excessively consuming unnecessary power.

According to an embodiment of the disclosure, the washing machine 110 among external devices 100 may operate in the idle state for a time period remaining except for a time period of performing various operations such as washing, dehydration, drying, or the like according to a user input. For example, assuming that a time period for which the washing machine 110 operates in the active state is about 3 hours in a day, when power continues to be stably supplied to the washing machine 110, the washing machine 110 operates in the idle state for the remaining 21 hours. For example, by operating in the idle state, the washing machine 110 may maintain a state allowing an input of a user to be received, or may stand by such that a scheduled operation may be performed at a pre-scheduled time. However, even though the amount of power consumed per unit time by the washing machine 110 in the idle state is small, when the washing machine 110 operates in the idle state for a long period of time, a significantly large amount of power may be needlessly consumed.

Therefore, the electronic device 1000 according to an embodiment of the disclosure may control the washing machine 110 such that the amount of power needlessly consumed due to the operation of the washing machine 110 in the idle state may be minimized. For example, when the washing machine 110 operates in the idle state and the amount of power consumed during the operation of the washing machine 110 in the idle state is equal to or greater than a reference value, the electronic device 1000 may control the washing machine 110 such that the washing machine 110 operates in the power-off state.

In addition, according to an embodiment of the disclosure, the set-top box 120 among the external devices 100 may operate in the idle state for a time period remaining except for a time period for which a user watches content via the set-top box 120. For example, assuming that a time period for which the set-top box 120 operates in the active state is about 4 hours in a day, when power continues to be stably supplied to the set-top box 120, the set-top box 120 operates in the idle state for the remaining 20 hours. By operating in the idle state, the set-top box 120 may maintain a state allowing an input of a user by a button or a remote control to be received, or may stand by such that a scheduled operation such as video recording, playback, or the like may be performed at a pre-scheduled time. However, even though the amount of power consumed per unit time by the set-top box 120 in the idle state is small, when the set-top box 120 operates in the idle state for a long period of time, a significantly large amount of power may be needlessly consumed.

Therefore, the electronic device 1000 according to an embodiment of the disclosure may control the set-top box 120 such that the amount of power needlessly consumed due to the operation of the set-top box 120 in the idle state may be minimized. For example, when the set-top box 120 operates in the idle state and the amount of power consumed during the operation of the set-top box 120 in the idle state is equal to or greater than a reference value, the electronic device 1000 may control the set-top box 120 such that the set-top box 120 operates in the power-off state.

Further, according to an embodiment of the disclosure, the charger 130 among the external devices 100 may operate in the idle state after charging for a battery is completed. The charger 130 may operate in the idle state until the time the charger 130 is able to perform a charging operation on a battery. However, even though the amount of power consumed per unit time by the charger 130 in the idle state is small, when the charger 130 operates in the idle state for a long period of time, a significantly large amount of power may be needlessly consumed.

Therefore, the electronic device 1000 according to an embodiment of the disclosure may control the charger 130 such that the amount of power needlessly consumed due to the operation of the charger 130 in the idle state may be minimized. For example, when the charger 130 operates in the idle state and the amount of power consumed during the operation of the charger 130 in the idle state is equal to or greater than a reference value, the electronic device 1000 may control the charger 130 such that the charger 130 operates in the power-off state.

The electronic device 1000 according to an embodiment of the disclosure may determine whether noise output from the charger 130 is abnormal. For example, when the noise output from the charger 130 is sensed to be greater than noise generated in a normal state of the charger 130, the electronic device 1000 may determine that the charger 130 is in an abnormal state. When it is determined that the charger 130 is in the abnormal state, the electronic device 1000 according to an embodiment of the disclosure may cut off power transferred to the charger 130. The electronic device 1000 may also notify the user that the charger 130 is in the abnormal state.

For example, as the user carries the electronic device 1000 and moves to a place where the charger 130 is located, the electronic device 1000 may sense the noise output from the charger 130. The electronic device 1000 according to an embodiment of the disclosure may determine a state of the charger 130 based on the sensed noise and may notify the user of a result of the determination. The user may cut off power of the charger 130 according to the notification of the electronic device 1000.

The external device 100 according to an embodiment of the disclosure may include a component that may perform a control command of the electronic device 1000. For example, the external device 100 may include a smart plug that receives a control command of the electronic device 1000 according to an embodiment of the disclosure and performs an operation according to the received control command.

While coupled to the external device 100, the smart plug according to an embodiment of the disclosure may receive a control command of the electronic device 1000 according to an embodiment of the disclosure and may perform an operation of controlling the external device 100 according to the received control command.

As another example, the electronic device 1000 may internally include a component corresponding to the smart plug set forth above.

Without being limited to the examples set forth above, the external device 100 may include various types of components that may perform a control command of the electronic device 1000 according to an embodiment of the disclosure.

According to an embodiment of the disclosure, the electronic device 1000 may perform various operations based on information about the operation state of the external device 100, without being limited to controlling the external device 100 based on the operation state of the external device 100, which is determined based on the noise.

For example, the electronic device 1000 may provide, to a user, the information about the operation state of the external device 100, which is determined based on the sensed noise according to an embodiment of the disclosure. As an example, the electronic device 1000 may provide, to a user, the information about the operation state of the external device 100, which is determined according to an embodiment of the disclosure, whereby the electronic device 1000 may guide the user to shut off the power supplied to the external device 100. In addition, the electronic device 1000 may provide, to a user, information about the external device 100 that the user may currently control, based on the information about the operation state of the external device 100, which is determined according to an embodiment of the disclosure.

As another example, the electronic device 1000 may obtain information about an operation pattern of at least one external device 100 possessed by a user, based on information about an operation state of the at least one external device 100, which is determined based on the noise according to an embodiment of the disclosure.

As yet another example, the electronic device 1000 may obtain information about the amount of power consumed according to the operation state of the external device 100, based on the information about the operation state of the external device 100, which is determined based on the noise according to an embodiment of the disclosure.

Without being limited to the examples set forth above, the electronic device 1000 may perform various operations based on the information about the operation state of the external device 100. The external device 100 according to an embodiment of the disclosure may be registered with at least one of the electronic device 1000 or a server (not shown) in advance before a control operation of the electronic device 1000 according to an embodiment of the disclosure is performed. For example, when the electronic device 1000 senses noise in a certain region and thus identifies a new external device 100, the electronic device 1000 may obtain information about the identified external device 100 and register the obtained information with at least one of the electronic device 1000 or a server (not shown). The electronic device 1000 may perform a control operation according to an embodiment of the disclosure, based on the previously registered information about the external device 100.

The aforementioned information about the external device 100 may include, for example, at least one of noise characteristics-related information, identification information, function information, or category information, as information needed to perform a control operation according to an embodiment of the disclosure. Without being limited to the examples set forth above, the information about the external device 100 may include various types of information, as the information needed to perform a control operation according to an embodiment of the disclosure.

In addition, the information about the external device 100 may include information received from the external device 100, information collected regarding the external device 100 by using at least one sensor included in the electronic device 1000, for example, information about noise characteristics according to the operation state of the external device 100, information related to the external device 100 and received by the electronic device 1000 from another device (for example, a server), or the like. Without being limited to the examples set forth above, the information about the external device 100 may be obtained by various methods and registered with at least one of the electronic device 1000 or a server (not shown).

According to an embodiment of the disclosure, when noise having new characteristics different from characteristics of noise of various devices pre-registered in the electronic device 1000 are sensed, the electronic device 1000 may determine whether a state of an external device 100 in the house is in an abnormal state. For example, when noise having different frequency and magnitude characteristics is sensed, the electronic device 1000 may determine whether at least one of devices in the house is in the abnormal state.

The electronic device 1000 according to an embodiment of the disclosure may determine the operation state of the external device 100 by further using other information related to the external device 100 as well as by using the noise sensed for the external device 100, and may control the external device 100 according to a result of the determination thereof.

For example, the quality of the noise sensed for the external device 100 by the electronic device 1000 may be low due to noise of an ambient environment. As the quality of the sensed noise is lower, the accuracy for the operation state of the external device 100, which may be determined by the electronic device 1000, may be lower. Therefore, when the accuracy for the operation state of the external device 100, which may be determined based on the noise sensed by the electronic device 1000, is equal to or less than a reference value, the electronic device 1000 may determine the operation state of the external device 100 by further using other information related to the external device 100.

The other information related to the external device 100 may include various types of information, such as information about an electromagnetic wave generated from the external device 100, information obtained from an image taken of the external device 100, or the like.

According to an embodiment of the disclosure, the electronic device 1000 may sense an electromagnetic wave generated from an ambient environment and may determine the operation state of the external device 100 by further using information about the sensed electromagnetic wave. For example, the electronic device 1000 may determine the operation state of the external device 100, based on the intensity of the electromagnetic wave sensed for the external device 100.

In addition, according to an embodiment of the disclosure, the electronic device 1000 may determine the operation state of the external device 100 by further using an image taken of the external device 100. The image taken of the external device 100 may include various types of images taken to include the external device 100, including a still image, a video, or the like. For example, the electronic device 1000 may determine the operation state of the external device 100, based on an exterior state of the external device 100 included in the image.

According to an embodiment of the disclosure, the electronic device 1000 may obtain noise generated by the external device 100 from audio data collected by the electronic device 1000 by using various methods for sensing a sound source, such as non-negative matrix factorization (NMF) and degenerate unmixing estimation technique (DUET). Without limiting to the examples set forth above, the electronic device 1000 may obtain the noise generated by the external device 100 from audio data collected through the microphone by using the various methods.

According to an embodiment of the disclosure, a method of controlling, by the electronic device 1000, the external device 100 may further include an operation by a server (not shown).

The server (not shown) according to an embodiment of the disclosure may be implemented with at least one computer device. For example, the server (not shown) may include various types of server devices, such as a cloud server, an edge server, or the like. The server (not shown) may be dispersed in a cloud form and may provide a command, a code, a file, content, or the like.

The server (not shown) may perform operations that the electronic device 1000 may perform. For example, the server (not shown) may perform an operation according to an embodiment of the disclosure based on the information about the noise sensed by the electronic device 1000, and may transmit, to the electronic device 1000, a result of performing the operation. The operation according to an embodiment of the disclosure may include at least one of an operation of determining the operation state of the external device 100 based on the information about the noise sensed by the electronic device 1000, an operation of obtaining the amount of power consumed by the external device 100 during the operation of the external device 100 in the idle state based on a result of the determination of the operation state, or an operation of controlling the external device 100 based on the obtained amount of power.

The server (not shown) according to an embodiment of the disclosure may perform at least one of the operations set forth above, based on information stored in the server, for example, various information such as information about the noise characteristics of the external device 100, information about the amount of power consumed by the external device 100, or the like.

The electronic device 1000 according to an embodiment of the disclosure may receive, from the server (not shown), a result of performing at least one of the operations set forth above, and may perform an operation of controlling the external device 100 according to an embodiment of the disclosure based on the received result.

Figure 2:
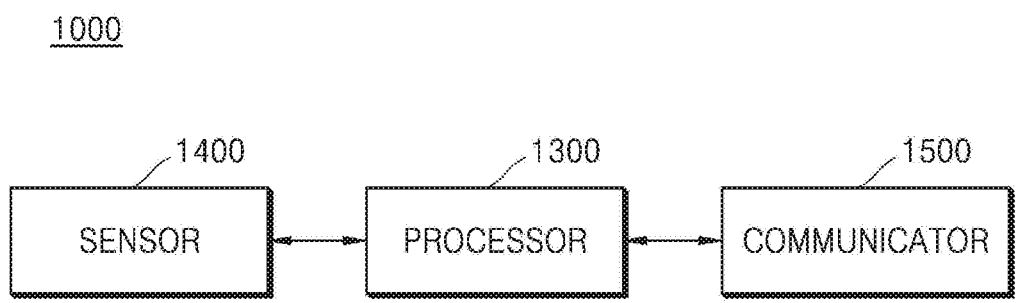
FIGS. 2 and 3 are block diagrams illustrating an internal configuration of an electronic device, according to an embodiment of the disclosure.
Figure 3:
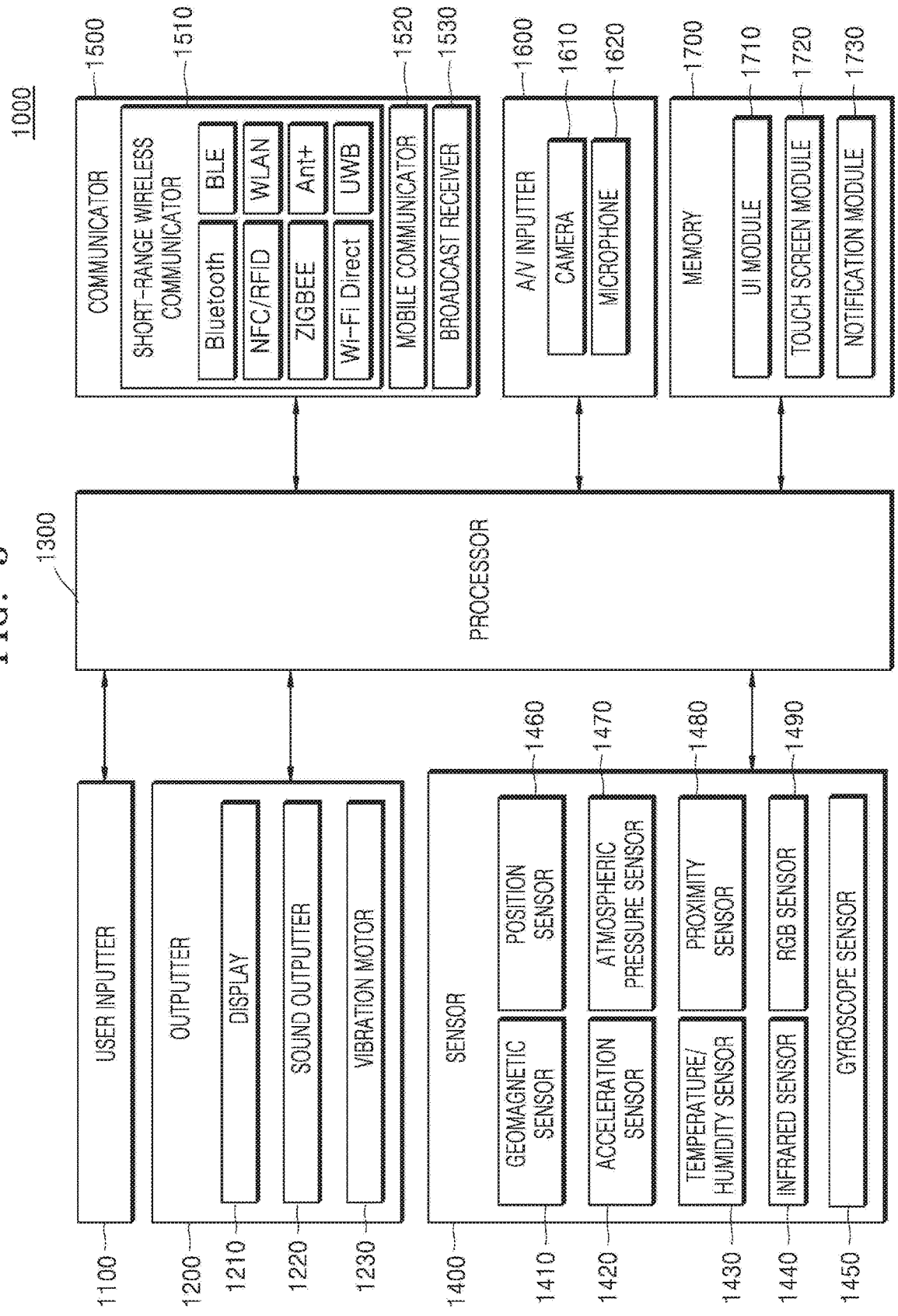

FIGS. 2 and 3 are block diagrams illustrating internal configurations of an electronic device according to an embodiment of the disclosure.

Referring to FIG. 2, the electronic device 1000 may include a sensing unit or sensor 1400, at least one processor 1300, and a communication unit, transceiver, or communicator 1500. However, not all components shown in FIG. 2 are necessary components of the electronic device 1000. The electronic device 1000 may be implemented by more components than the components shown in FIG. 2 or may be implemented by fewer components than the components shown in FIG. 2.

For example, referring to FIG. 3, the electronic device 1000 according to an embodiment of the disclosure may further include a user inputter 1100, an outputter 1200, an audio/video (A/V) inputter 1600, and a memory 1700, in addition to the sensor 1400, the processor 1300, and the communicator 1500.

The user inputter 1100 is for a user to input data for controlling the electronic device 1000. For example, the user inputter 1100 may include, but is not limited to, a keypad, a dome switch, a touchpad (a touch capacitive overlay type touch pad, a pressure resistive overlay type touch pad, an infrared beam sensing type touch pad, a surface acoustic wave type touch pad, an integral strain gauge type touch pad, a piezo electric type touch pad, or the like), a jog wheel, a jog switch, or the like.

According to an embodiment of the disclosure, the user inputter 1100 may receive a user input for performing a certain operation. For example, according to the user input received by the user inputter 1100, the electronic device 1000 may sense the noise of the external device 100 and may perform an operation of controlling the external device 100 based on the sensed noise.

The outputter 1200 may output an audio signal, a video signal, or a vibration signal and may include a display unit or display 1210, a sound outputter 1220, and a vibration motor 1230.

The outputter 1200 according to an embodiment of the disclosure may output a result of performing an operation according to a user request. For example, the outputter 1200 may output information about at least one of the operation state of the external device 100, which is determined based on the sensed noise of the external device 100, or the amount of power consumed by the external device 100. In addition, the outputter 1200 may output information about an operation of controlling the external device 100, the operation being performed according to the sensing of the noise of the external device 100.

The display 1210 displays and outputs information processed by the electronic device 1000.

When the display 1210 and a touchpad form a layer structure and thus constitute a touch screen, the display 1210 may also be used as an input device in addition to being used as an output device. The display 1210 may include at least one of a liquid crystal display, a thin film transistor-liquid crystal display, an organic light-emitting diode, a flexible display, a three-dimensional (3D) display, or an electrophoretic display. In addition, according to an implementation type of the electronic device 1000, the electronic device 1000 may include two or more displays 1210.

The sound outputter 1220 outputs audio data received from the communication unit 1500 or stored in the memory 1700.

The vibration motor 1230 may output a vibration signal. In addition, the vibration motor 1230 may output a vibration signal when a touch is input to a touch screen.

The processor 1300 generally controls an overall operation of the electronic device 1000. For example, the processor 1300 may take overall control of the user inputter 1100, the outputter 1200, the sensor 1400, the communicator 1500, the A/V inputter 1600, or the like, by executing programs stored in the memory 1700. The electronic device 1000 may include the at least one processor 1300, but is not limited thereto.

The processor 1300 may be configured to process a command of a computer program by performing basic arithmetic, logic, and input/output operations. The command may be provided from the memory 1700 to the processor 1300 or may be received by the communicator 1500 and thus provided to the processor 1300. For example, the processor 1300 may be configured to execute a command according to a program code stored in a recording device such as memory.

The processor 1300 according to an embodiment of the disclosure may determine the operation state of the external device 100 based on the noise of the external device 100, which is sensed by the sensor 1400, may generate a signal for controlling the external device 100 based on the operation state of the external device 100, and may transmit the generated signal to the external device 100 via the communicator 1500. For example, the processor 1300 may determine whether the external device 100 operates in the idle state by determining, based on the sensed noise, the operation state of the external device 100 as one out of the power-off state, the idle state, and the active state.

In addition, the processor 1300 according to an embodiment of the disclosure may also identify the external device 100 corresponding to the sensed noise and may obtain information about characteristics of the noise, which correspond to at least one operation state of the identified external device 100. The processor 1300 may determine the operation state of the external device 100, which corresponds to the sensed noise, based on the information about the characteristics of the noise.

In addition, the processor 1300 according to an embodiment of the disclosure may also obtain the amount of power consumed by the external device 100 during the operation of the external device 100 in the idle state according to a result of the determination of the operation state and may control the external device 100 based thereon. For example, the processor 1300 may control the external device 100, when the amount of power consumed by the external device 100 during the operation of the external device 100 in the idle state exceeds a reference value. As an example, the processor 1300 may control the external device 100 by changing the external device 100 from the idle state to the power-off state, based on the obtained amount of power. The amount of power consumed by the external device 100 during the operation of the external device 100 in the idle state may be an amount of power consumed by the external device 100 while the external device 100 is continuously operated in the idle state from a first time point to a current time point.

In addition, the processor 1300 according to an embodiment of the disclosure may also obtain information about the operation pattern of the external device 100 and may determine, based on the information about the operation pattern, whether the idle state of the external device 100 will continue for a reference time or more. The processor 1300 may control the external device 100 based on the amount of power which is obtained based on the sensed noise, and a result of the determination set forth above.

In addition, the processor 1300 according to an embodiment of the disclosure may also perform an operation of controlling the external device 100 such that the amount of power needlessly consumed by the external device 100 may be minimized based on the determined operation state of the external device 100 as well as the amount of power consumed by the external device 100 during the operation of the external device 100 in the idle state.

In addition, the processor 1300 according to an embodiment of the disclosure may also perform various operations based on the information about the operation state of the external device 100, without being limited to controlling the external device 100 based on the operation state of the external device 100, which is determined based on the noise.

The sensor 1400 may sense a state of the electronic device 1000 or an ambient state of the electronic device 1000 and may transfer sensed information to the processor 1300. According to an embodiment of the disclosure, the information sensed by the sensor 400 may be transferred as behavior data collected regarding a user to the processor 1300.

The sensor 1400 may include at least one of a geomagnetic sensor 1410, an acceleration sensor 1420, a temperature/humidity sensor 1430, an infrared sensor 1440, a gyroscope sensor 1450, a position sensor (for example, global positioning system (GPS)) 1460, an atmospheric pressure sensor 1470, a proximity sensor 1480, and/or a red, green, and blue (RGB) sensor (illuminance sensor) 1490, without being limited thereto.

The sensor 1400 according to an embodiment of the disclosure may also include a microphone, a vibration sensor, a noise detection sensor, or the like, as a sensor capable of sensing external noise and vibrations. Without being limited to the examples set forth above, the sensor 1400 may include at least one sensor of various types, which may sense sounds, vibrations, noise by vibrations, or the like.

The communicator 1500 may include one or more components allowing the electronic device 1000 to communicate with a server (not shown) or an external device (not shown) thereto. For example, the communicator 1500 may include a short-range wireless communication unit or communicator 1510, a mobile communication unit or communicator 1520, and/or a broadcast receiver 1530.

The communicator 1500 according to an embodiment of the disclosure may transmit a signal for controlling the external device 100 to the external device 100, the signal being generated by the processor 1300.

The short-range wireless communication unit 1510 may include, but is not limited to, a Bluetooth communication unit, a Bluetooth Low Energy (BLE) communication unit, a near field communication (NFC/RFID) unit, a wireless local area network (WLAN) (Wi-Fi) communication unit, a Zigbee communication unit, an Infrared Data Association (IrDA) communication unit, a Wi-Fi Direct (WFD) communication unit, an ultra-wideband (UWB) communication unit, an ANT+ communication unit, or the like.

The mobile communicator 1520 transmits a wireless signal to and receives a wireless signal from at least one of a base station, an external terminal, or a server over a mobile communication network. Here, the wireless signal may include various types of data according to transmission and reception of voice call signals, video call signals, or text/multimedia messages.

The broadcast receiver 1530 receives a broadcast signal and/or broadcast-related information from outside the electronic device 1000 via a broadcast channel. The broadcast channel may include a satellite channel or a terrestrial channel. Depending upon implementation examples, the electronic device 1000 may not include the broadcast receiver 1530.

The A/V inputter 1600 is for inputting an audio signal or a video signal and may include a camera 1610, a microphone 1620, or the like. The camera 1610 may obtain an image frame of a still image, a video, or the like via an image sensor in a video call mode or a shooting mode. An image captured by the image sensor may be processed by the processor 1300 or a separate image processing unit (not shown).

The microphone 1620 receives, as an input, an acoustic signal external to the electronic device 1000 and processes the acoustic signal into electrical audio data. Although the microphone 1620 according to an embodiment of the disclosure may operate as an input device for receiving the external acoustic signal as an input and performing a certain operation, the microphone 1620 is not limited thereto and may operate as a sensor of the sensor 1400 for sensing noise external to the electronic device 1000.

The memory 1700 may store a program for processing and control of the processor 1300 and may store data that is input to the electronic device 1000 or output from the electronic device 1000.

The memory 1700 according to an embodiment of the disclosure may store one or more instructions, and the at least one processor 1300 of the electronic device 1000 described above may perform an operation of controlling the external device 100 according to an embodiment of the disclosure by executing the one or more instructions stored in the memory 1700.

For example, the at least one processor 1300 may control the sensor 1400 to sense the noise generated by the operation of the external device 100, may determine, based on the sensed noise, whether the external device 100 operates in the idle state, may obtain the amount of power consumed by the external device 100 during the operation of the external device 100 in the idle state when the external device 100 operates in the idle state, may generate a signal for controlling the external device 100 based on the obtained amount of power, and may control the communicator 1500 to transmit the generated signal to the external device 100.

In addition, the memory 1700 according to an embodiment of the disclosure may store information about the operation of the external device 100. For example, the memory 1700 may store the information about the operation pattern of the external device 100, the information about the characteristics of the noise generated according to the operation state of the external device 100, the information about the amount of power consumed according to the operation state of the external device 100, or the like. Without being limited to the examples set forth above, the memory 1700 may store information required for the processor 1300 to generate a signal for controlling the external device 100, according to an embodiment of the disclosure.

The memory 1700 may include a storage medium having at least one of a flash memory type, a hard disk type, a multimedia card micro type, a memory card type (for example, secure digital (SD) or extreme digital (XD) memory, or the like), a random access memory (RAM) type, a static random access memory (SRAM) type, a read-only memory (ROM) type, an electrically erasable programmable read-only memory (EEPROM) type, a programmable read-only memory (PROM) type, a magnetic memory type, a magnetic disk type, or an optical disk type.

Programs stored in the memory 1700 may be classified into a plurality of modules according to functions thereof and, for example, may be classified into a user interface (UI) module 1710, a touch screen module 1720, a notification module 1730, and the like.

The UI module 1710 may provide a specialized UI, a graphical user interface (GUI), or the like, which is interlocked with the electronic device 1000 for each application. The touch screen module 1720 may sense a touch gesture of a user on a touch screen and may transfer information about the touch gesture to the processor 1300. The touch screen module 1720 according to some embodiments of the disclosure may recognize and analyze a touch code. The touch screen module 1720 may be configured as separate hardware including a controller.

To sense a touch or a proximity touch with respect to a touch screen, various sensors may be provided inside or near the touch screen. An example of a sensor for sensing a touch on the touch screen is a tactile sensor. The tactile sensor refers to a sensor sensing contact with a specific object to such an extent that a human feels or higher. The tactile sensor may sense various information such as roughness of a contact surface, hardness of a contact object, a temperature of a contact point, or the like.

The touch gesture of the user may include tap, touch and hold, double tap, drag, panning, flick, drag and drop, swipe, or the like.

The notification module 1730 may generate a signal for notifying the occurrence of an event of the electronic device 1000.

Figure 4:
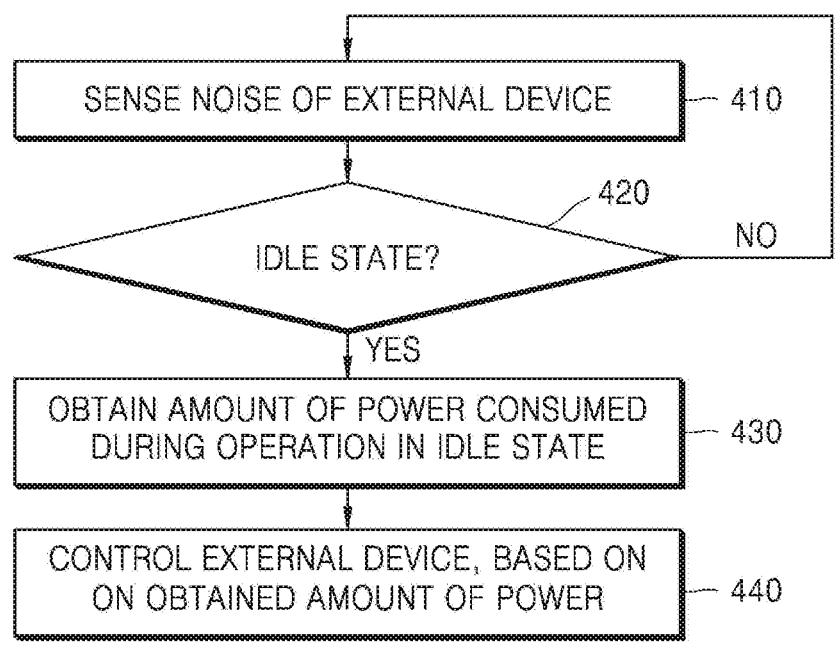
FIG. 4 is a flowchart illustrating a method of controlling an external device, according to an embodiment of the disclosure.

FIG. 4 is a flowchart illustrating a method of controlling an external device, according to an embodiment of the disclosure.

Referring to FIG. 4, in an operation 410, the electronic device 1000 may sense the noise generated according to the operation of the external device 100 via a sensor 1400 included in the electronic device 1000.

In an embodiment of the disclosure, the noise generated according to the operation of the external device 100, that is, the noise of the external device 100 which may be sensed by the electronic device 1000, may include various types of noise generated according to the operation of the external device 100, noise by vibrations, or the like.

In an operation 420, the electronic device 1000 may determine, based on the noise sensed in the operation 420, whether the external device 100 operates in the idle state. For example, the electronic device 1000 may determine in which state the external device 100 operates among the power-off state, the idle state, and the active state, based on the sensed noise.

The electronic device 1000 according to an embodiment of the disclosure may identify the external device 100 for the sensed noise based on information about the noise that may be generated by the external device 100. In addition, the electronic device 1000 may determine the operation state of the external device 100 based on information about the noise for the identified external device 100.

When the external device 100 is not operated in the idle state, for example, when the external device 100 operates in the power-off state or the active state, the electronic device 1000 may determine that no power is needlessly consumed by the external device 100. Thus, the electronic device 1000 does not perform an operation of controlling the external device 100 according to an embodiment of the disclosure and may repeatedly perform the operation 410 of sensing the noise for the external device 100.

In an operation 430, when it is determined that the external device 100 operates in the idle state, the electronic device 1000 may obtain the amount of power consumed by the external device 100 during the operation of the external device 100 in the idle state.

For example, the electronic device 1000 may obtain the amount of power consumed per unit time according to the operation state of the external device 100 based on information about the amount of power consumed according to the operation state of the external device 100. According to an embodiment of the disclosure, the information about the amount of power consumed according to the operation state of the external device 100 may be stored in a memory of the electronic device 1000 in advance before the operation 430 is performed.

In an operation 440, the electronic device 1000 may control the external device 100 such that the amount of power needlessly consumed by the external device 100 may be minimized based on the amount of power obtained in the operation 430.

For example, when the amount of power consumed by the external device 100 during the operation of the external device 100 in the idle state exceeds a reference value, the electronic device 1000 may control the external device 100 such that the amount of power needlessly consumed by the external device 100 may be minimized. As an example, the electronic device 1000 may control the external device 100 such that the operation state of the external device 100 is changed from the idle state to the power-off state.

The electronic device 1000 according to an embodiment of the disclosure may continuously or cyclically perform the aforementioned operation of controlling the external device 100 according to an embodiment of the disclosure. As another example, when the electronic device 1000 senses noise newly generated by the external device 100 or senses a change in characteristics of the noise previously sensed from the external device 100, the electronic device 1000 may perform the aforementioned operation of controlling the external device 100 according to an embodiment of the disclosure. Without being limited to the examples set forth above, the electronic device 1000 according to an embodiment of the disclosure may perform the operation of controlling the external device 100 according to an embodiment of the disclosure, under various conditions.

Figure 5:
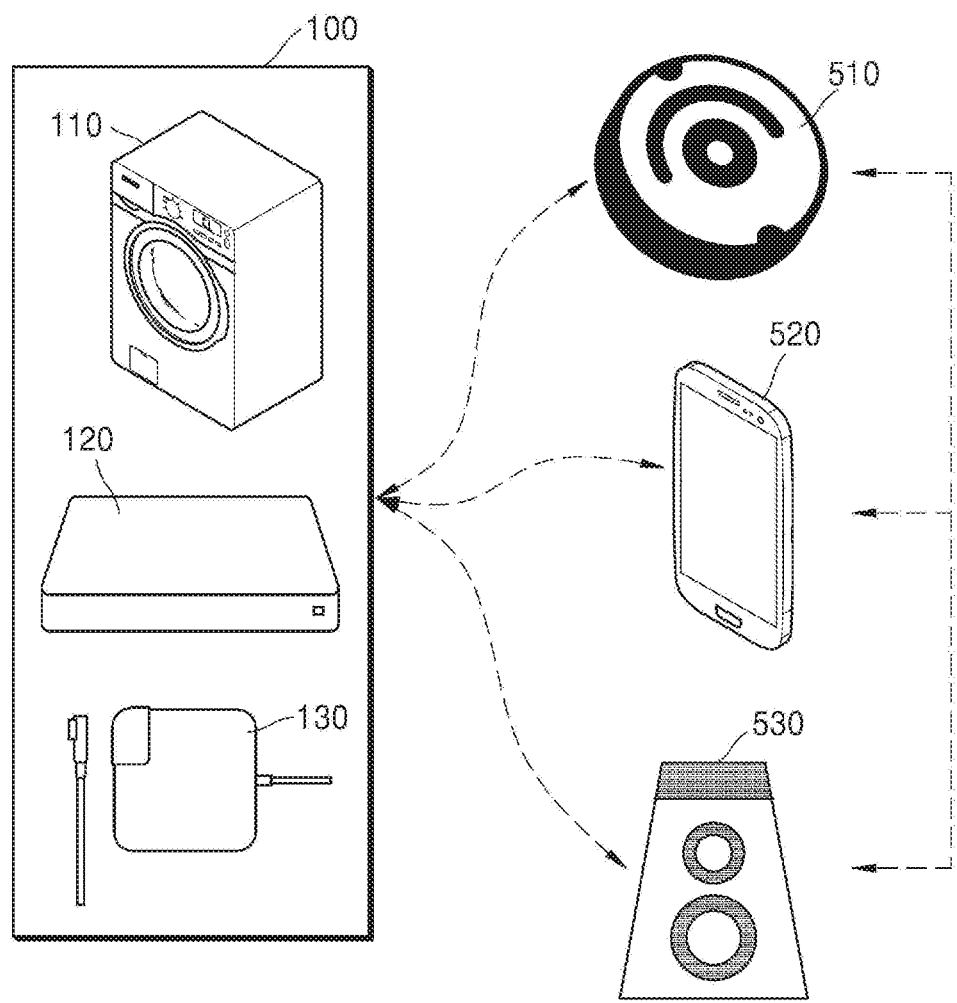
FIG. 5 is a diagram illustrating examples of electronic devices, according to an embodiment of the disclosure.

FIG. 5 is a diagram illustrating examples of electronic devices according to an embodiment of the disclosure.

Referring to FIG. 5, at least one electronic device 510, 520, or 530 may sense the noise of the external device 100 and may control the external device 100. The at least one electronic device 510, 520, or 530 in FIG. 5 may correspond to the electronic device 1000 in FIG. 1.

As in the example shown in FIG. 5, the at least one electronic device 510, 520, or 530 according to an embodiment of the disclosure may include a robot vacuum cleaner 510, a smart phone 520, and a smart speaker device 530.

The robot vacuum cleaner 510 according to an embodiment of the disclosure may sense various noise generated by various external devices 100 while moving to various places in a house. The robot vacuum cleaner 510 may control the external device 100 according to an embodiment of the disclosure, based on information about the sensed noise. Alternatively, the robot vacuum cleaner 510 may transfer the information about the sensed noise to another electronic device (for example, 520 or 530), whereby the other electronic device (for example, 520 or 530) may perform an operation of controlling the external device 100 according to an embodiment of the disclosure, based on the transferred information.

In addition, the robot vacuum cleaner 510 according to an embodiment of the disclosure may notify the user of information about the state of the external device 100 determined based on the information about the sensed noise, through the other electronic device (for example, 520 or 530). Therefore, the user may control the external device 100 such that the external device 100 may perform various operations, based on the information about the state of the external device 100.

In addition, the robot vacuum cleaner 510 according to an embodiment of the disclosure may identify at least one external device 100 based on the sensed noise, and may generate information about the external device 100 existing in a house based on information about the identified at least one external device 100. The information about the external device 100 existing in the house may include, for example, position information of each external device 100 in the house, an operation state of each external device 100 determined based on the sensed noise, the amount of power consumed by each external device 100, or the like. To allow various operations to be performed based on the information about the external device 100 existing in the house, the robot vacuum cleaner 510 may transmit the aforementioned information to a server external thereto or the smart phone 520. For example, the smart phone 520 may determine an operation pattern of each external device 100 based on the aforementioned information, and may perform various operations based on the operation pattern. The smart phone 520 may also obtain information about the user's behavior or habit based on the operation pattern of each external device 100.

Like the robot vacuum cleaner 510, the smart phone 520 according to an embodiment of the disclosure may sense various noise generated by various external devices 100 while moving to various places in the house and may control the external device 100 based on the sensed noise. In addition, by further considering noise-related information received from the robot vacuum cleaner 510, the smart phone 520 may perform an operation of controlling the external device 100 according to an embodiment of the disclosure. The smart speaker device 530 according to an embodiment of the disclosure, at a fixed position in the house, may sense various noise generated by various external devices 100 and may control the external device 100 based on the sensed noise.

For example, the smart speaker device 530 may determine whether charging of the charger 130 is completed based on the sensed noise. When it is determined that the charging is completed, the smart speaker device 530 may output information indicating that the charging of the charger 130 is completed through a speaker of the smart speaker device 530, or may transfer the information to the smart phone 520.

In addition, the smart speaker device 530 according to an embodiment of the disclosure may notify the user of the information about states of the various external devices 100 in the house, which is determined based on the sensed noise. For example, when it is determined that the user is in the house, the smart speaker device 530 placed in the house may output an audio signal indicating the information through the speaker. When it is determined that the user is not in the house, the smart speaker device 530 may transfer the information to the smart phone 520 of the user. The user may receive the information through the smart phone 520.

In addition, by further considering the noise-related information received from the robot vacuum cleaner 510, the smart speaker device 530 according to an embodiment of the disclosure may perform an operation of controlling the external device 100 according to an embodiment of the disclosure.

Therefore, according to an embodiment of the disclosure, the at least one electronic device 510, 520, or 530 may control the external device 100 according to an embodiment of the disclosure, based on the information about the noise of the external device 100 sensed by the at least one electronic device 510, 520, or 530.

FIG. 6 is a diagram illustrating an example in which an electronic device controls an external device according to an embodiment of the disclosure.

Referring to FIG. 6, the electronic device 1000 may sense noise generated by a charger 610 that is one of the external devices 100, and may selectively perform one or more of operations 630, 640, 650, and 660 based on the sensed noise. The one or more operations 630, 640, 650, and 660 may be performed simultaneously, in a specified order (hierarchy), or in an order that is dependent upon the outcome of a previously performed operation.

The charger 610 may perform a charging operation on a device 620 including a battery and may operate in the idle state when the charging for the battery is completed.

When the charger 610 operates in the idle state, a different noise from that in the case where the charger 610 operates in the power-off state or the active state may be generated. For example, when the charger 610 operates in the power-off state, no noise may be generated. In addition, when the charger 610 operates in the active state, noise due to a charging operation may be generated. Further, when the charger 610 operates in the idle state, noise having a lower intensity than the noise generated in the active state may be generated. Furthermore, when the charger 610 is in an abnormal state, noise greater than the noise in the active state may be generated.

The electronic device 1000 according to an embodiment of the disclosure may determine, based on the noise sensed from the charger 610, whether the charger 610 operates in the idle state. In addition, according to an embodiment of the disclosure, the electronic device 1000 may control the charger 610, based on the amount of power consumed by the charger 610 during the operation of the charger 610 in the idle state.

For example, the electronic device 1000 may cyclically determine the operation state of the charger 610, and may obtain the amount of power consumed by the charger 610 based on the operation state of the charger 610 at each time point. Based on the operation state of the charger 610 from at least one previous time point, the electronic device 1000 may predict the amount of power consumed by the charger 610 in the idle state until a current time point. As an example, the electronic device 1000 may predict the amount of power consumed by the charger 610 in the idle state, based on information about the amount of power consumed according to the type, model year, operation state, or the like of the charger 610.

According to an embodiment of the disclosure, when the amount of power consumed by the charger 610 in the idle state is equal to or greater than a reference value, the electronic device 1000 may determine that standby power consumed by the charger 610 is excessive, and may control the charger 610 such that the standby power may be minimized.

In addition, in the operation 630, the electronic device 1000 according to an embodiment of the disclosure may notify a user of information about the amount of power consumed by the charger 610 in the idle state. For example, the electronic device 1000 may output, via a display, information about the standby power consumed by the charger 610, thereby guiding the user to shut off power supplied by the charger 610.

In addition, in the operation 640, when the amount of power consumed by the charger 610 in the idle state is equal to or greater than the reference value, the electronic device 1000 according to an embodiment of the disclosure may control the charger 610 such that the charger 610 is allowed to consume no power by deactivating power that is output to the charger 610.

In addition, in the operation 650, the electronic device 1000 according to an embodiment of the disclosure may remove a connection between a socket outlet and the charger 610 such that the charger 610 is not allowed to operate in the idle state. For example, the electronic device 1000 may control a separate device (not shown) connecting the charger 610 to the socket outlet such that the power supplied from the socket outlet to the charger 610 is shut off.

In addition, in the operation 660, the electronic device 1000 according to an embodiment of the disclosure may add, to a power consumption log, information about the standby power consumed by the charger 610 and determined based on the sensed noise. The power consumption log set forth above may include information about the amount of power consumed by the at least one external device 100. The electronic device 1000 may provide to a user, the information about the amount of power consumed by the at least one external device 100 by making the power consumption log based on information about the standby power obtained according to an embodiment of the disclosure. Without being limited to the examples set forth above, the electronic device 1000 may perform various operations based on the power consumption log and may provide a result thereof to a user.

Without being limited to the embodiments described above, the electronic device 1000 may control the external device 100 in various situations, according to an embodiment of the disclosure.

For example, as the electronic device 1000 is moved by a user to be around a region in which the charger 610 is placed, the electronic device 1000 may sense the noise generated by the charger 610. Alternatively, the electronic device 1000 may continuously or cyclically sense, at a fixed position, the noise generated by the charger 610. When the electronic device 1000 determines, based on the noise generated by the charger 610, that the charger 610 operates in the idle state, the electronic device 1000 may control the charger 610 based on the amount of power consumed in the idle state.

In addition, the electronic device 1000 may notify a user that the amount of power consumed by the charger 610 in the idle state is equal to or greater than a reference value, whereby the electronic device 1000 may guide the user to shut off the power supplied to the charger 610. For example, the electronic device 1000 may display the aforementioned information about the charger 610 on a display of the electronic device 1000, or may operate to allow the information about the charger 610 to be displayed on a display of another device (for example, a smart phone) carried by the user.

According to an embodiment of the disclosure, even without a separate additional device, the external device may be controlled such that unnecessary standby power is not consumed, based on the noise generated by the external device.

An embodiment of the disclosure may also be implemented in the form of a recording medium including instructions executable by a computer, such as a program module executed by a computer. A computer readable medium may be any available medium accessible by a computer and includes volatile and non-volatile media and removable and non-removable media. In addition, the computer readable medium may include a computer storage medium and a communication medium. The computer storage medium includes volatile and non-volatile media and removable and non-removable media, which are implemented by any method or technique for storing information such as computer readable instructions, data structures, program modules, or other data. The communication medium typically includes computer readable instructions, data structures, or program modules, and includes any information delivery medium.

In addition, as used herein, the term "unit" may refer to a hardware component such as a processor or a circuit and/or a software component executed by a hardware component such as a processor.

It will be understood that the description made above is provided for illustration and that various changes in form and details may be made therein by those of ordinary skill in the art without departing from the spirit and scope of the disclosure. Therefore, it should be understood that the foregoing embodiments of the disclosure are provided for illustrative purposes in all aspects and are not to be construed in any way as limiting the disclosure. For example, each component described as being of a single type may be implemented in a dispersed manner, and similarly, components described as being dispersed may be implemented in a combined form.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A method, performed by an electronic device, of controlling an external device, the method comprising:
    sensing noise generated by an operation of the external device;
    determining, based on the sensed noise, whether the external device operates in an idle state, wherein the idle state is a state that the external device is turn on but does not performing an operation;
    in response that the external device continuously operates in the idle state, calculating an amount of power consumed by the external device from a time point at which the external device starts to operate in the idle state, based on information about an amount of average power consumed per unit time by the external device in the idle state;
    determining whether the amount of power consumed by the external device in the idle state exceeds a reference value; and
    based on the determining that the amount of power consumed by the external device in the idle state exceeds the reference value, provide guide information informing that the amount of power consumed by the external device in the idle state exceeds the reference value and guiding that a user cuts off the power supplied to the external device.

2. The method according to claim 1, wherein the determining of whether the external device operates in the idle state comprises:
    determining, based on the sensed noise, an operation state of the external device as one of a power-off state, the idle state, and an active state; and
    determining, based on the determined operation state, whether the external device operates in the idle state.

3. The method according to claim 1, wherein the determining of whether the external device operates in the idle state comprises:
identifying the external device corresponding to the sensed noise;
obtaining information about characteristics of the sensed noise, wherein the characteristics correspond to at least one operation state of the identified external device; and
determining an operation state of the external device corresponding to the sensed noise based on the information about the characteristics of the sensed noise.

4. The method according to claim 1, further comprising:
obtaining information about an operation pattern of the external device;
determining, based on the information about the operation pattern, whether the idle state of the external device will continue for at least a reference time; and
controlling the external device based on the calculated amount of power and a result of the determining of whether the idle state of the external device will continue for at least the reference time.

5. The method according to claim 1, further comprising:
controlling the external device by changing the external device from the idle state to a power-off state based on the calculated amount of power.

6. An electronic device comprising:
a sensor;
a communicator;
a memory storing one or more instructions; and
at least one processor configured to execute the one or more instructions stored in the memory to:
control the sensor to sense noise generated by an operation of a device external to the electronic device,
determine, based on the sensed noise, whether the external device operates in an idle state, wherein the idle state is a state that the external device is turn on but does not performing an operation,
in response that the external device continuously operates in the idle state, calculate an amount of power consumed by the external device from a time point at which the external device starts to operate in the idle state, based on information about an amount of average power consumed per unit time by the external device in the idle state,
determine whether the amount of power consumed by the external device in the idle state exceeds a reference value, and
based on the determining that the amount of power consumed by the external device in the idle state exceeds the reference value, provide guide information informing that the amount of power consumed by the external device in the idle state exceeds the reference value and guiding that a user cuts off the power supplied to the external device.

7. The electronic device according to claim 6, wherein the at least one processor is further configured to execute the one or more instructions to:
determine, based on the sensed noise, an operation state for the external device as one of a power-off state, the idle state, and an active state, and
determine, based on the determined operation state, whether the external device operates in the idle state.

8. The electronic device according to claim 6, wherein the at least one processor is further configured to execute the one or more instructions to:
identify the external device corresponding to the sensed noise,
obtain information about characteristics of the sensed noise, wherein the characteristics correspond to at least one operation state of the identified external device, and
determine an operation state of the external device corresponding to the sensed noise, based on the information about the characteristics of the sensed noise.

9. The electronic device according to claim 6, wherein the at least one processor is further configured to execute the one or more instructions to:
obtain information about an operation pattern of the external device,
determine, based on the information about the operation pattern, whether the idle state of the external device will continue for a reference time or more, and
control the external device, based on the calculated amount of power and a result of determining whether the idle state of the external device will continue for the reference time or more.

10. The electronic device according to claim 6, wherein the at least one processor is further configured to execute the one or more instructions to control the external device by changing the external device from the idle state to a power-off state based on the calculated amount of power.

11. A computer executable program product comprising a computer-readable non-transitory recording medium having recorded thereon a program, wherein the program when executed by at least one processor, configures the at least one processor to:
sense noise generated by an operation of an external device;
determine, based on the sensed noise, whether the external device operates in an idle state, wherein the idle state is a state that the external device is turn on but does not performing an operation;
in response that the external device continuously operates in the idle state, calculate an amount of power consumed by the external device from a time point at which the external device starts to operate in the idle state, based on information about an amount of average power consumed per unit time by the external device in the idle state;
determine whether the amount of power consumed by the external device in the idle state exceeds a reference value; and
based on the determining that the amount of power consumed by the external device in the idle state exceeds the reference value, provide guide information informing that the amount of power consumed by the external device in the idle state exceeds the reference value and guiding that a user cuts off the power supplied to the external device.

* * * * *